US 9,233,490 B2

United States Patent
Marchesano et al.

(10) Patent No.: US 9,233,490 B2
(45) Date of Patent: Jan. 12, 2016

(54) MULTILAYER LOAD BEARING PANEL

(71) Applicant: Century Plastics, Inc., Shelby Township, MI (US)

(72) Inventors: Joseph W. Marchesano, Macomb, MI (US); Calvin A. Saur, West Bloomfield, MI (US)

(73) Assignee: Century Plastics, Inc., Shelby Township, MI (US)

( * ) Notice: Subject to any disclaimer, the term of this patent is extended or adjusted under 35 U.S.C. 154(b) by 0 days.

(21) Appl. No.: 14/449,238

(22) Filed: Aug. 1, 2014

(65) Prior Publication Data

US 2015/0054311 A1   Feb. 26, 2015

Related U.S. Application Data

(60) Provisional application No. 61/870,035, filed on Aug. 26, 2013.

(51) Int. Cl.
| | |
|---|---|
| *B29C 70/34* | (2006.01) |
| *B29C 43/20* | (2006.01) |
| *B32B 3/04* | (2006.01) |
| *B32B 3/30* | (2006.01) |
| *B32B 3/26* | (2006.01) |
| *B60R 13/01* | (2006.01) |
| *B32B 5/02* | (2006.01) |
| *B32B 7/02* | (2006.01) |

(Continued)

(52) U.S. Cl.
CPC ............ *B29C 43/203* (2013.01); *B29C 70/345* (2013.01); *B32B 3/04* (2013.01); *B32B 3/266* (2013.01); *B32B 3/30* (2013.01); *B32B 5/028* (2013.01); *B32B 7/02* (2013.01); *B32B 7/12* (2013.01); *B32B 27/12* (2013.01); *B32B 27/20* (2013.01); *B60R 13/01* (2013.01); *B32B 2262/0253* (2013.01); *B32B 2305/08* (2013.01); *B32B 2307/718* (2013.01); *B32B 2471/00* (2013.01); *B32B 2605/003* (2013.01); *Y10T 428/31565* (2015.04)

(58) Field of Classification Search
CPC ................... B32B 2038/0088; B32B 38/1875; B32B 38/0032; B32B 38/0036; B32B 2038/0048; B32B 2038/006; D06C 3/08; B29C 70/685; B29C 70/70; B29C 65/70
See application file for complete search history.

(56) References Cited

U.S. PATENT DOCUMENTS 5,441,675 A * 8/1995 Souders ................ B29C 33/046
264/321
5,591,289 A * 1/1997 Souders ................ B29C 70/088
156/148

(Continued)

*Primary Examiner* — Matthew Daniels
(74) *Attorney, Agent, or Firm* — Quinn Law Group, PLLC

(57) ABSTRACT

A panel assembly includes a multilayer panel including first and second layers made of loftable material characterized by a molded orientation resultant from lofting and subsequently compressing the loftable material during molding of the multilayer panel. The panel assembly may be light-weight with a low profile to minimize protrusion into an opening or compartment enclosed by the panel. The multilayer panel may be configured to as a floor panel enclosing an opening defined by a floor structure, which may be a vehicle floor. The multilayer panel may include at least one recess portion configured to strengthen the multilayer panel. A method of making the multilayer panel includes tethering the loftable material in a tethering frame prior to lofting and transferring the tethering frame including the lofted material into a mold to form into the multilayer panel. The tethering frame retains offal for removal from the mold after forming the panel.

12 Claims, 6 Drawing Sheets

(51) Int. Cl.
*B32B 7/12* (2006.01)
*B32B 27/12* (2006.01)
*B32B 27/20* (2006.01)

(56) References Cited

U.S. PATENT DOCUMENTS 5,900,300 A * 5/1999 Slaven ................. B29C 70/345
428/157

6,328,548 B1 * 12/2001 Salas ................. B29C 45/14008
264/252
6,695,939 B1 * 2/2004 Nakamura ............ B29C 43/203
156/222
2003/0124314 A1 * 7/2003 Michael .................... B32B 3/28
428/156
2013/0309464 A1 * 11/2013 Pfaffelhuber ............. B32B 5/26
428/212

* cited by examiner

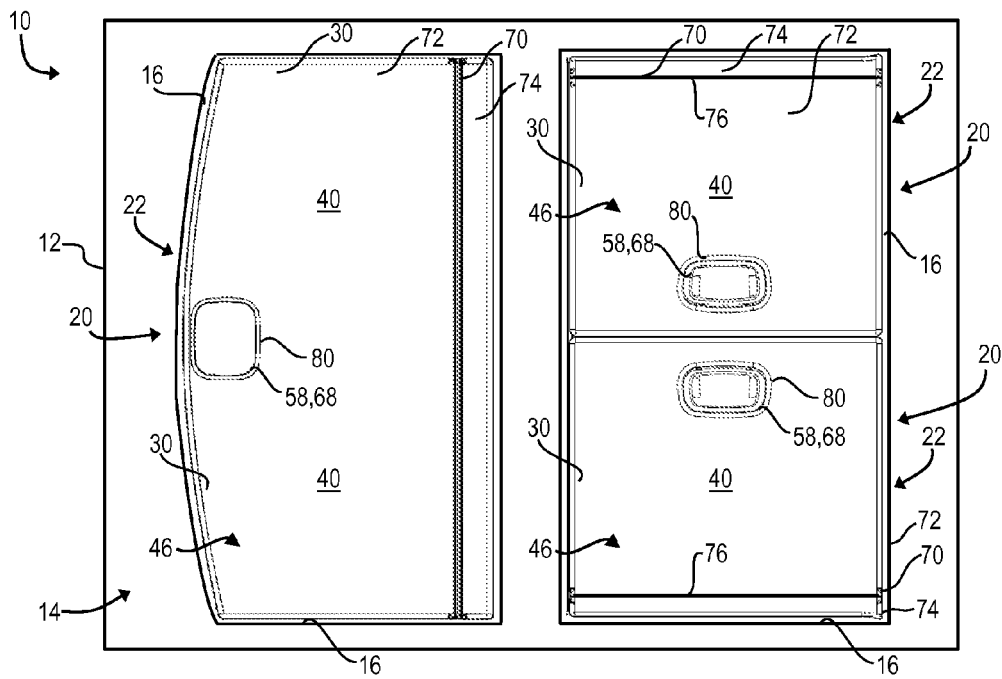
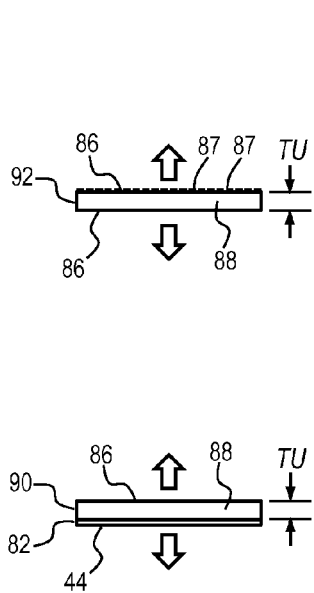
FIG. 2A
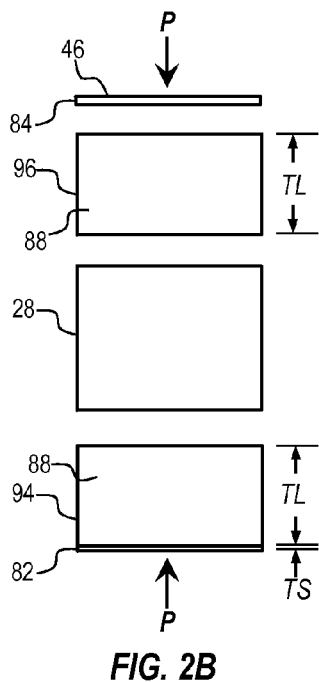
FIG. 2B
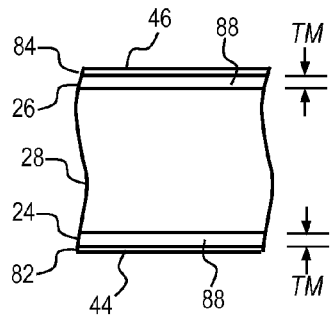
FIG. 2C

MULTILAYER LOAD BEARING PANEL

CROSS-REFERENCE TO RELATED APPLICATION

This application claims the benefit of U.S. Provisional Application No. 61/870,035, filed Aug. 26, 2013, which is hereby incorporated by reference in its entirety.

TECHNICAL FIELD

The present invention relates generally to a load bearing panel assembly.

BACKGROUND

A panel may be used to enclose a structure which may define an opening or compartment which is to be covered by the panel. The panel may be configured to withstand a force or load imposed on the panel without failing and/or exceeding a maximum deflection. Panels are used in vehicles to enclose various structures. For example, door panels configured to withstand bending and deflection forces are used to enclose door structures. In another example, a floor panel may be positioned in a floor, trunk, storage, or cargo space of a vehicle to enclose a compartment used to enclose or store one or more vehicle components, such as a spare tire or vehicle jack, or other vehicle user items, such as luggage, tools, etc. The floor panel should be configured to withstand bending and deflection forces and loads imposed by items which may be placed on the floor panel, which may include vehicle users standing, sitting or kneeling on the floor panel. A floor panel may be used in a vehicle including one or more retractable seats, where the floor panel is configured to cover the seat(s) when the seat(s) are fully retracted into a compartment defined by the floor structure of the vehicle. In this configuration, the panel should be configured to withstand loading and deflection forces imposed on the panel when the seats are in the retracted position, which may include withstanding a minimum knee loading requirement. Floor panels strengthened by adding a matrix or grid of reinforcing materials, and/or by increasing the depth of the panel profile or the thickness of the panel are disadvantaged by volume and weight added to the floor panel, such that the panel assembly presents a weight penalty to the vehicle and/or may be difficult to manipulate by a user, and/or the thick panel structure extends substantially into the vehicle compartment being enclosed to consume a portion of the compartment space, thus limiting the open compartment space available for storage, for example, of the retracted seat(s).

SUMMARY

A panel assembly including a multilayer panel and a method for making the multilayer panel are provided herein. The multilayer panel is configured to enclose an opening, and includes an exterior surface, an interior surface, a first molded layer, a second molded layer, and a core insert positioned between and bonded to the first and second molded layers. The multilayer panel may further include an interior cover layer adhered to the first molded layer such that the first molded layer is between the core insert and the interior cover layer, and an exterior cover layer adhered to the second molded layer such that the second molded layer is between the core insert and the exterior cover layer.

The first layer includes a molded loftable polymer composite characterized by a first oriented polymeric structure corresponding to the interior surface. The second layer including a molded loftable polymer composite characterized by a second oriented polymeric structure corresponding to the exterior surface and a core insert between the first and second layers and adhered to the first layer and to the second layer. The polymer composite includes chopped reinforcing fibers distributed in a thermoplastic matrix molded during forming of the multilayer panel such that the first oriented polymeric structure is characterized by the chopped reinforcing fibers compressed and constrained in the thermoplastic matrix in an orientation corresponding to the exterior surface of the multilayer panel, and the second oriented polymeric structure is characterized by the chopped reinforcing fibers compressed and constrained in the thermoplastic matrix in an orientation corresponding to the interior surface.

The multilayer panel may further include at least one recessed portion defined by the interior surface and the core insert. The recessed portion includes a base portion characterized by the first layer adhered directly to the second layer and defines a recess. The recess may have a frusto-polyhedral and frusto-conical shape. The multilayer panel may include a plurality of recessed portions which may be configured to decrease the weight and/or increase the stiffness of the multilayer panel. The multilayer panel may be configured as a load bearing panel configured to withstand a knee load of at least 250 pounds applied to a central portion of the multilayer panel. The multilayer panel may be further configured as a low-profile panel such that the overall thickness of the panel assembly does not exceed 25.4 mm.

The multilayer panel may be configured to enclose an opening defined by a structure including a structure surface having a structure interface portion defining the opening. The multilayer panel may include a central portion defined by the core insert and a peripheral portion surrounding the central portion. The peripheral portion may be characterized by the first layer adhered directly to the second layer and configured to interface with the structure interface portion to enclose the opening. In one example, the structure is configured as a vehicle including a vehicle floor, with the vehicle floor defining the structure surface and the opening, and may include a compartment accessible via the opening. The multilayer panel may be one of a first panel configured to enclose a first portion of the opening and a second panel configured to enclose a remaining portion of the opening, such that each of the first and second panels is configured to interface with the structure interface portion and the other of the first and second panels to enclose the opening.

The multilayer panel may include a hinged portion hingedly connecting a first panel portion and a second panel portion. The hinged portion includes at least one hinge characterized by the first layer adhered directly to the second layer. The multilayer panel may include one or more apertures defined by an aperture lip and configured to receive a panel detail, where the aperture lip is defined by the first layer adhered directly to the second layer. The panel detail may be, for example, configured as a handle, fastener, or decorative trim attachable to the multilayer panel to provide a panel assembly.

A method for making the multilayer panel is provided. The method includes tethering a first unlofted sheet to a first tethering frame, tethering a second unlofted sheet to a second tethering frame, activating the first and second sheets in the tethered position to provide, respectively, a first lofted sheet tethered to the first tethering frame and a second lofted sheet tethered to the second frame, wherein activating includes heating the polymer composite to a temperature sufficient to loft each of the first and second unlofted sheets to form, respectively, the first and second lofted sheets. The method may further include activating an adhesive applied to each of the first and second sheets, which may be a thermally activated adhesive. The adhesive may be an adhesive film applied to at least one side of the first and second sheets, which may be a perforated adhesive film. In one example, a perforated adhesive film may be applied to both sides of the second sheet.

The method further includes inserting the first tethering frame including the attached first lofted sheet into a mold such that an interior cover layer adhered to the first lofted sheet interfaces with a first mold surface of the mold, then sequentially inserting a core insert, the second tethering frame including the attached second lofted sheet, and an exterior cover layer into the mold such that the exterior cover layer interfaces with a second mold surface. A molding force is exerted on the layered materials by the first and second mold surfaces to form the multilayer panel, where the molding force and closing movement of the mold surfaces is sufficient to compress the first and second lofted sheets to form, respectively, first and second molded layers characterized by a molded thickness less than the unlofted thickness of the first and second unlofted sheets from which the first and second molded layers are formed. The mold and/or mold surfaces may be configured to trim the multilayer panel during the molding operation, e.g., in the mold, such that the waste material or offal trimmed from the perimeter portion of the multilayer panel may be removed from the mold while attached to the tethering frames, e.g., the offal and the tethering frames may be concurrently removed from the mold. The method may further include assembling or operatively attaching one or more panel details to the multilayer panel to form the panel assembly.

An alternative method includes tethering only the second unlofted sheet to a tethering frame prior to activating the first and second sheets to form, respectively, first and second lofted sheets. The alternative method includes inserting the tethering frame including the first lofted sheet into the mold, then sequentially inserting a core insert, the second lofted sheet, and an exterior cover layer into the mold and molding the multilayer panel. In this alternative method the waste material or offal trimmed from the perimeter portion of the multilayer panel may be removed from the mold while attached to the tethering frame.

The above features and other features and advantages of the present teachings are readily apparent from the following detailed description of the best modes for carrying out the present teachings when taken in connection with the accompanying drawings.

BRIEF DESCRIPTION OF THE DRAWINGS

FIG. 1 is a schematic partial view of a structure including a plurality of panel assemblies configured to enclose an opening defined by the structure, each panel assembly including a multilayer panel;

FIG. 2A is a schematic cross-sectional view of a first sheet in an unlofted condition and a second sheet in an unlofted condition;

FIG. 2B is a schematic exploded cross-sectional view of the layers of the multilayer panel prior to forming, including the first sheet of FIG. 2A in a lofted condition and the second sheet of FIG. 2A in a lofted condition;

FIG. 2C is a schematic fragmentary cross-sectional view of section 2C-2C of the multilayer panel of FIG. 3A after forming the panel;

DETAILED DESCRIPTION

Figure 3A:
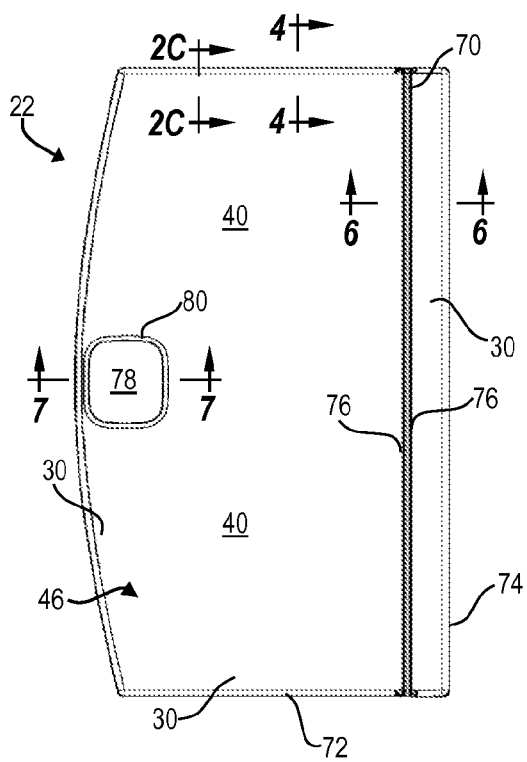
FIG. 3A is a schematic top view of an outer side of a multilayer panel of FIG. 1.

A panel assembly 20 including a multilayer panel 22 and methods 200, 300 for making the multilayer panel 22 are provided herein. The multilayer panel 22 is configured as a load bearing panel of lightweight construction and is further configured as a low profile panel. Referring to the drawings wherein like reference numbers represent like components throughout the several figures, the elements shown in FIGS. 1-10B are not necessarily to scale or proportion. Accordingly, the particular dimensions and applications provided in the drawings presented herein are not to be considered limiting.

Figure 4:
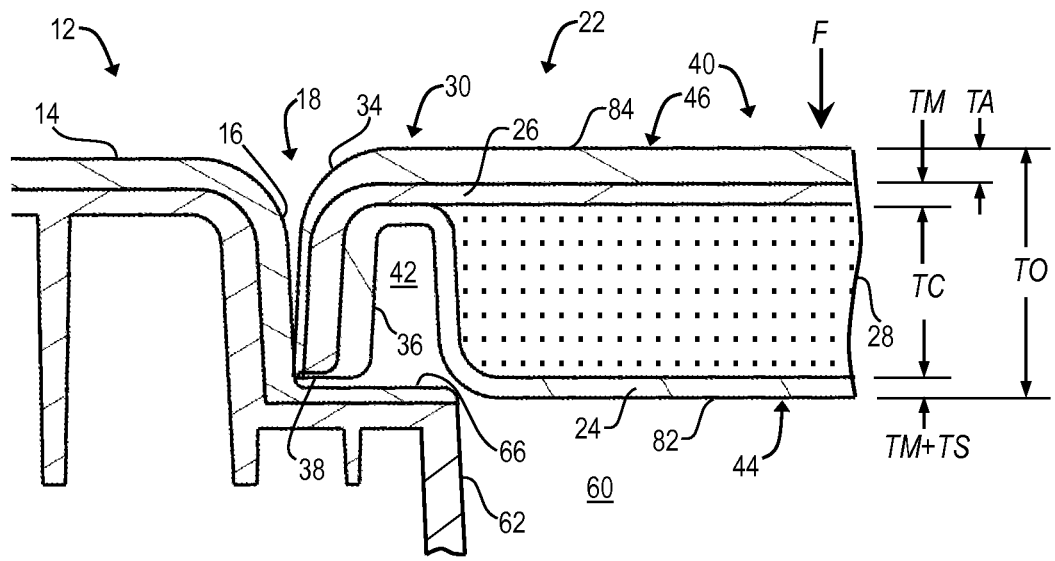
FIG. 4 is a fragmentary cross-sectional view of section 4-4 of the multilayer panel of FIG. 3A including a perimeter portion of the panel.

Referring to FIG. 1, a structure generally indicated at 10 includes a structure element 12 and at least one multilayer panel 22, which may be configured as a panel assembly 20. The structure element 12 includes a structure surface 14 and at least one structure opening 18. The structure opening 18 is defined by a structure interface portion 16. As shown in FIG. 4, the structure 10 may include a compartment 60 accessible through the structure opening 18 and defined by a compartment surface 62. In an "installed position," as that term is used herein and as shown in FIG. 1, the multilayer panel 22 interfaces with, e.g., is received by the structure interface portion 16 to enclose the structure opening 18 when the multilayer panel 22 is in the installed position. When the multilayer panel 22 is in an "opened position," as that term is used herein, the multilayer panel 22 may be repositioned relative to the opening 18 and/or the structure interface portion 16 and/or fully or partially removed from the opening 18 to provide access to the opening 18 and/or compartment 60. The multilayer panel 22 includes a central portion 40 surrounded by a peripheral portion 30 defining a peripheral edge 38 (see FIG. 4) of the multilayer panel 22. The peripheral portion 30 is configured to interface with the structure interface portion 16 in the installed position such that the multilayer panel 22 is supported by and/or retained in the structure interface portion 16 to enclose the compartment 60.

In the installed position, an exterior surface 46 of the multilayer panel 22 is provided by the outermost outwardly facing layer of the multilayer panel 22, such that the exterior surface 46 of the multilayer panel 22 is visible from outside the compartment 60 enclosed by the multilayer panel 22. The exterior surface 46 may be characterized as an appearance surface, which may also be referred to as a Class A surface, as that term is generally understood in automotive and consumer goods industries. The profile and/or shape of the exterior surface 46 is defined by the second molded layer 26. In the installed position, an interior surface 44 of the multilayer panel 22 is provided by the innermost inwardly facing layer of the multilayer panel 22, such that the interior surface 44 of the multilayer panel 22 is visible from inside the compartment 60 and is not visible from outside the compartment 60 with the multilayer panel 22 in the installed position. The interior surface 44 may be visible from outside the compartment 60 with the multilayer panel 22 in an opened position. The profile and/or shape of the interior surface 44 is defined by the first molded layer 24.

The structure surface 14 of the structure element 12 is adjacent the multilayer panel 22 in an installed position, such that the structure surface 14 and the exterior surface 46 of the multilayer panel 22 are adjacent and concurrently visible from outside the compartment 60. The structure surface 14 of the structure element 12 may be configured as an appearance surface. The structure surface 14 and the exterior surface 46 may be configured to match or complement each other, or may include the same or complementary materials, to provide a uniform and/or consistent appearance between the multilayer panel 22 and the structure 10 with the multilayer panel 22 in the installed position.

In one example, the structure 10 may be configured as a vehicle 10 and the structure element 12 may be configured, for example, as a vehicle body panel or a vehicle floor panel 12 which may be positioned in a floor, trunk, or storage or cargo space of a vehicle structure 10 and configured to enclose one or more vehicle compartments 60 defined by the vehicle structure 10. One or more multilayer panels 22 may be configured to enclose the one or more vehicle compartments 60 as shown in FIG. 1. For example, a first multilayer panel 22 may be configured to enclose a first portion of the opening structure opening 18 and a second multilayer panel 22 may be configured to enclose a remaining portion of the structure opening 18; wherein each of the first and second panels 22 is configured to interface with the structure interface portion 16 and to interface with the other of the first and second panels 22 to enclose the structure opening 18.

One or more of the vehicle compartments 60 may be configured to house, enclose, store, or provide access to one or more vehicle components (not shown), which may include, for example, a spare tire, vehicle jack, battery, electrical wiring, vehicle 10 frame or structural component, etc. or may be configured to enclose or store other vehicle user items, such as luggage, tools, etc. The vehicle structure 10 may include a seat storage compartment 60 accessible via an opening 18 in the floor panel 12 of the vehicle 10, such that the multilayer panel 22 may be configured to enclose the opening 18 of the seat storage compartment 60. The vehicle 10 may include one or more retractable seats (not shown), where at least one or a combination of the multilayer panels 22 may be configured to cover one or more of the seats when the seat(s) are fully retracted into the seat storage compartment 60.

Various combinations of multilayer panels 22, openings 18, and/or compartments 60 in a vehicle or other structure 10 are possible, and the illustrative examples provided herein are not intended to be limiting. By way of non-limiting example, a multilayer panel 22 may be configured to enclose more than one opening 18. Two or more multilayer panels 22 may be arranged to enclose a single opening 18, wherein the single opening 18 may be configured to provide access to one or more compartments 60.

Referring now to FIGS. 2A-2C, FIG. 2C shows the multilayer construction of an exemplary multilayer panel 22. The multilayer panel 22 includes a first molded layer 24 and a second molded layer 26 made of a loftable polymer composite 88. In methods 200, 300 of making the multilayer panel 22 described in further detail herein, the first and second molded layers 24, 26 are formed from, respectively, a first unlofted sheet 90 and a second unlofted sheet 92 shown in FIG. 2A, which are lofted to provide, respectively, first and second lofted sheets 94, 96 shown in FIG. 2B. The first and second lofted sheets 94, 96 are then inserted into a mold 102 with other layers of material and compressed during molding of the multilayer panel 22 to form, respectively, the first and second molded layers 24, 26 of the multilayer panel 22, of which a fragmentary cross-section is shown in FIG. 2C. Each of the first and second unlofted sheets 90, 92 is characterized by an unlofted thickness TU. The unlofted thickness TU may be the same or different for each of the first and second unlofted sheets 90, 92. In one example, the unlofted thickness TU of the first and second unlofted sheets 90, 92 is approximately 2.5 mm thick and/or ranges between 2.5 to 2.7 mm thick. The loftable polymer composite 88 may be configured as a low pressure thermoformable composite of thermoplastic resin (not shown) mixed with long chopped reinforcing fiber (not shown) which has been formed into a composite sheet (not shown) characterized by the chopped reinforcing fiber dispersed in a thermoplastic matrix of the thermoplastic resin, which is then laminated to provide the unlofted sheet having an unlofted polymeric structure in which the chopped fibers are compressed and constrained in the thermoplastic resin in their compressed state. In one example, the thermoplastic resin may include or substantially comprise polypropylene, and the reinforcing fiber may be a glass fiber, and the unlofted sheet may be characterized by an aereal weight (mass per unit area) of 1600 grams per square meter (gsm). By way of non-limiting example, the unlofted sheet may be a lightweight reinforced thermoplastic (LWRT) material such as an Azdel Superlite® material.

The first unlofted sheet 90 in the example shown is used to form a first molded layer 24 of the multilayer panel 22 shown in FIG. 2C, where the first molded layer 24 may be configured as an inwardly facing layer of the multilayer panel 22 when the multilayer panel 22 is in an installed position. The first unlofted sheet 90 may include an interior cover layer 82 which may be applied to a first side of the first unlofted sheet 90 during lamination and forming of the first unlofted sheet 90, such that the interior cover layer 82 is bonded or adhered to the first unlofted sheet 90. The interior cover layer 82 may be coextensive with the first unlofted sheet 90 and configured as the outermost inwardly facing layer of the multilayer panel 22, such that the first layer is between the cover layer and one of the core insert 28 and the second layer, and the interior cover layer 82 defines an interior surface 44 of the multilayer panel 22 after forming of the panel. By way of non-limiting example, the interior cover layer 82 may be made of a scrim such as a polyester or polyethylene terephthalate (PET) scrim, a scrim reinforced polyethylene, a scrim-like material, a felt, a felted material, or other moldable or compression formable material, which may be a woven or non-woven material. By way of example, the interior cover layer 82 may be a 90 gsm (g/m$^2$) scrim material. The interior cover layer 82 may be configured to interface with a first mold surface 104 of the mold 102 during forming of the panel, to provide a protective surface of the multilayer panel 22, and/or to provide an interior surface 44 of the multilayer panel 22 having a uniform texture and/or appearance. The interior cover layer 82, which may also be referred to herein as the scrim layer 82, may have a thickness TS, which may be minimal or nominal relative to the overall thickness TO (see FIG. 4) of the multilayer panel 22. By way of non-limiting example, the interior cover layer 82 may have a thickness TS of 0.5 mm or less. The interior cover layer 82 may be a breathable layer, e.g., configured such that air may flow through the interior cover layer 82 during lofting of the first unlofted sheet 90 to form the first lofted sheet 94, and/or during compression of the first lofted sheet 94 to form the first molded layer 24 during molding of the multilayer panel 22.

The first unlofted sheet 90 may be heated to a lofting temperature defined by the loftable polymer composite 88 to loft the polymer composite 88 and form a first lofted sheet 94 shown in FIG. 2B. Elevating the temperature of the compressed polymer composite 88 of the first unlofted sheet 90 to the lofting temperature causes the thermoplastic matrix to relax and the compressed chopped fibers to decompress such that the first unlofted sheet 90 lofts, e.g., increases in thickness and decreases in density, to provide the first lofted sheet 94 and such that the first lofted sheet 94 is characterized by a lofted thickness TL which is greater than and proportionate to the unlofted thickness TU of the first unlofted sheet 90. The first lofted sheet 94 is characterized by a lofted polymeric structure (not shown) in which the chopped fibers are decompressed and randomly oriented in the thermoplastic matrix. By way of non-limiting example, the ratio of the lofted thickness TL to the unlofted thickness TU may range from 4 to 4.5, such that an unlofted sheet having an unlofted thickness TU ranging from 2.0 mm to 2.7 mm may, after lofting, provide a lofted sheet having a lofted thickness TL of 8 mm to 12 mm.

Referring again to FIG. 2A, the second side of the first unlofted sheet 90 may include an adhesive 86, such as an adhesive film 86 or coating, which may be a thermally activated adhesive 86. By way of example, the adhesive 86 may be a polyamide adhesive. The methods 200, 300 of forming of the multilayer panel 22 may include activating the adhesive 86 while heating the first unlofted sheet 90 to loft the polymer composite 88, such that the adhesive 86 may be used in a molding step subsequent to lofting to bond the first lofted sheet 94 to another layer, for example, to a core insert 28 and/or to the second molded layer 26 of the multilayer panel 22 as shown in FIGS. 4-7.

The second unlofted sheet 92 in the example shown is used to form a second molded layer 26 of the multilayer panel 22 shown in FIG. 2C, where the second molded layer 26 may be configured as an outwardly facing layer of the multilayer panel 22 when the multilayer panel 22 is in an installed position. The second unlofted sheet 92 may be heated to a lofting temperature defined by the loftable polymer composite 88 to loft the polymer composite 88 and to form a second lofted sheet 96 shown in FIG. 2B. Elevating the temperature of the compressed polymer composite 88 of the second unlofted sheet 92 to the lofting temperature causes the thermoplastic matrix to relax and the compressed chopped fibers to decompress such that the second sheet 92 lofts, e.g., increases in thickness and decreases in density, to provide the second lofted sheet 96 and such that the second lofted sheet 96 is characterized by a lofted thickness TL which is greater than and proportionate to the unlofted thickness TU of the second unlofted sheet 92. The second lofted sheet 96 is characterized by a lofted polymeric structure (not shown) in which the chopped fibers are decompressed and randomly oriented in the thermoplastic matrix. By way of non-limiting example, the ratio of the lofted thickness TL to the unlofted thickness TU may range from 4 to 4.5, such that an unlofted sheet having an unlofted thickness TU ranging from 2.0 mm to 2.7 mm may, after lofting, provide a lofted sheet having a lofted thickness TL of 8 mm to 12 mm.

Referring again to FIG. 2A, at least one of the opposing sides of the second unlofted sheet 92 may include an adhesive 86, such as an adhesive film 86 or coating, which may be a thermally activated adhesive 86. The methods 200, 300 of forming of the multilayer panel 22 may include activating the adhesive 86 while heating the second unlofted sheet 92 to loft the polymer composite 88, such that the adhesive 86 may be used in a molding step subsequent to lofting to bond the second lofted sheet 96 to another layer, for example, to a core insert 28, to an exterior cover layer 84, and/or to the first molded layer 24 of the multilayer panel 22 as shown in FIGS. 4-7. The adhesive film 86 may be a perforated adhesive film defining a plurality of openings or vents 87, such that air may flow or be vented through the adhesive film 86 during lofting of the second unlofted sheet 92 to form the second lofted sheet 96, and/or during compression of the second lofted sheet 96 to form the second molded layer 26 during molding of the multilayer panel 22. By way of example, the perforated adhesive film may be made of a polypropylene-based material. The openings 87 may be uniformly distributed across the adhesive film 86 such that air is uniformly dissipated or vented from the second lofted sheet 96 across the surface of the sheet 96 during compression of the second lofted sheet 96 to form the multilayer panel 22, and/or to adhere the second molded layer 26 to an exterior cover layer 84. In one example, the openings 87 may be distributed every 0.25 inch (approximately 6 mm) across the adhesive film 86.

As shown in FIGS. 2B and 2C, the multilayer panel 22 may include an exterior cover layer 84, which may be inserted into the mold 102 and bonded to the second molded layer 26 during molding of the multilayer panel 22. The exterior cover layer 84 may be coextensive with the second lofted sheet 96 and may be configured as the outermost outwardly facing layer of the multilayer panel 22 to provide an exterior surface 46 of the multilayer panel 22 after forming of the multilayer panel 22, wherein the shape and/or profile of the exterior surface 46 is defined by the second molded layer 26. By way of non-limiting example the exterior cover layer 84 may include, for example, a carpet or other textile material, which may be tufted or woven, a vinyl, thermoplastic olefin, or other polymeric material, which may be textured, coated or otherwise treated or processed to provide an appearance surface which may be a class A surface. The exterior cover layer 84 may be configured to interface with a second mold surface 124 of the mold 102 during forming of the multilayer panel 22, to provide a protective surface of the multilayer panel 22, and/or to provide an exterior surface 46 of the multilayer panel 22 having a uniform texture and/or appearance. The exterior cover layer 84, which may also be referred to herein as the appearance layer 84, may have a thickness TA (see FIG. 4). By way of non-limiting example, the exterior cover layer 84 may have a thickness TA of ranging from 0.5 mm to 3.5 mm. In one example, the exterior cover layer 84 is configured as a carpet or upholstery material having a thickness TA of approximately 3.0 to 3.5 mm.

The examples provided are non-limiting, and it would be understood that the exterior and interior cover layers 84, 82 may be made of the same material for uniformity of appearance between the interior and exterior surfaces 44, 46 of the multilayer panel 22. The material comprising the interior and exterior surfaces 44, 46 may be one of a woven or non-woven material or textile, a carpet material, an upholstery material, a scrim, a scrim reinforced material, a felt, a felted material, a vinyl material, or other moldable or compression formable material, which may be a woven or non-woven material.

Figure 5:
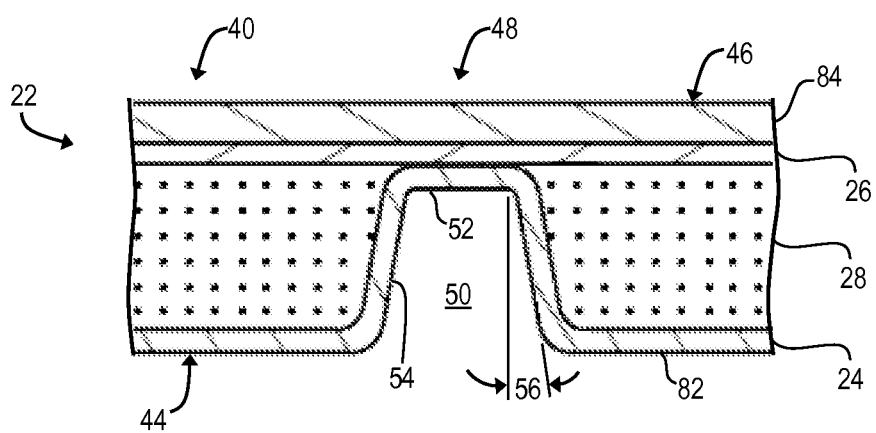
FIG. 5 is a fragmentary cross-sectional view of section 5-5 of the multilayer panel of FIG. 3B including a recessed portion of the panel.
Figure 6:
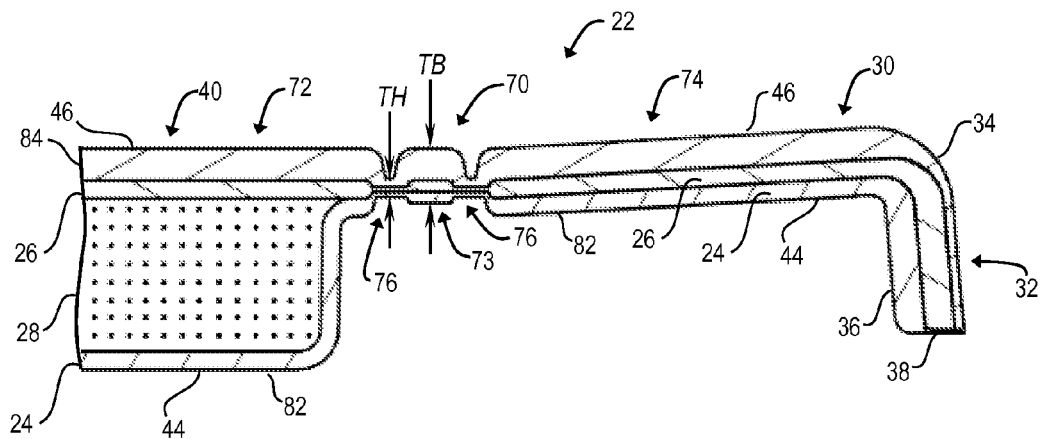
FIG. 6 is a fragmentary cross-sectional view of section 6-6 of the multilayer panel of FIG. 3A including a hinged portion of the panel.
Figure 7:
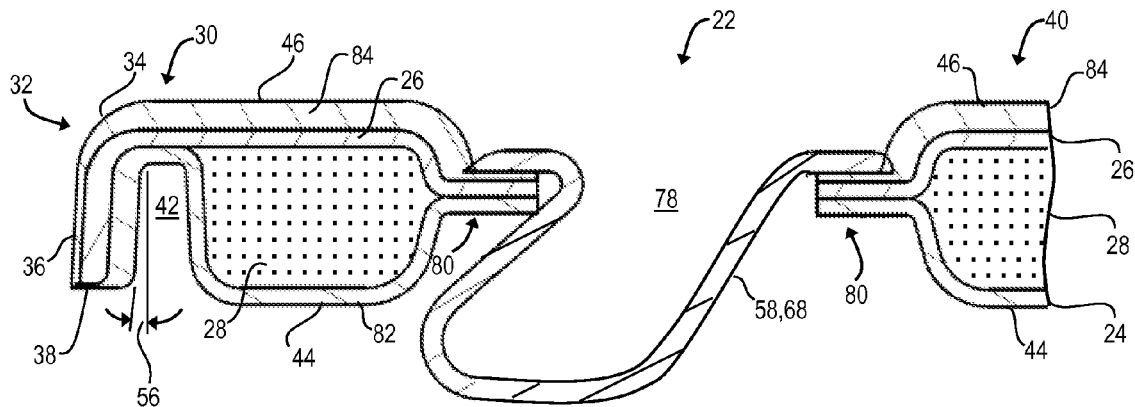
FIG. 7 is a schematic cross-sectional view of section 7-7 of the multilayer panel of FIG. 3A including an aperture defined by the panel.

As shown in FIGS. 2B and 2C, the multilayer panel 22 may include a core insert 28 which is inserted in the mold 102 between the first and second lofted sheets 94, 96, such that after molding, the core insert 28 is bonded and/or otherwise adhered to each of the first and second molded layers 24, 26. By way of non-limiting example, the core insert 28 may be made of a foam material made of a polymer material. In one example, the core insert 28 may be made of polyurethane foam having a density of approximately six (6) lbs./cu.ft. (pounds per cubic foot or PCF). The core insert 28 may be die cut or otherwise prefabricated prior to insertion into the mold 102 such that the core insert 28 is shaped to correspond to the configuration of the finished multilayer panel 22. For example, the core insert 28 may define one or more thinned or contoured portions and/or openings (not shown) which correspond to the one or more recesses 50 and/or apertures 78 formed in the multilayer panel 22, such that in the recessed portion 48, the core insert 28 is discontinuous in the recessed portion 48 of the multilayer panel 22, and, as shown in FIG. 5, the core insert 28 does not extend across a base portion 52 of the recessed portion 48, and, as shown in FIG. 7 the core insert 28 does not extend into the aperture lip 80. The core insert 28 may be shaped such that the core insert 28 is coextensive with, e.g., defines the central portion 40 of the molded panel and does not extend into the peripheral portion 30 of the multilayer panel 22 or into the hinged portion 70 of the panel, as shown in FIGS. 4, 6 and 7.

Figure 9:
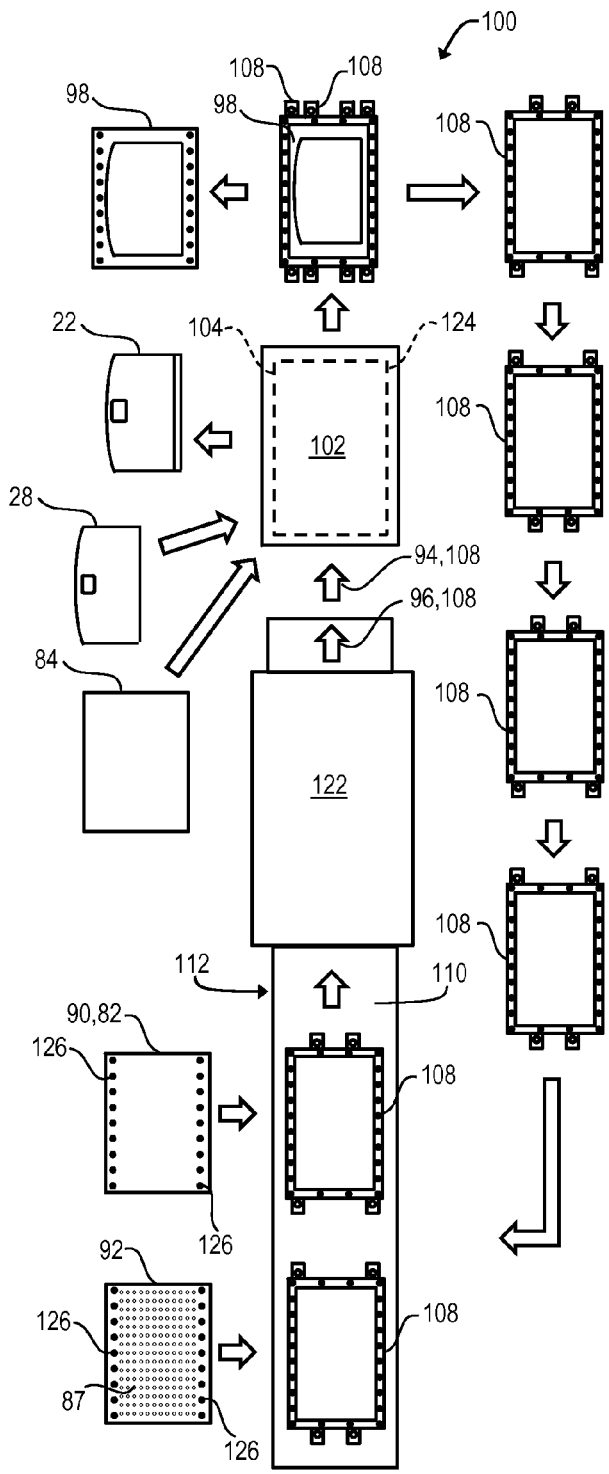
FIG. 9 is a schematic illustration of a system for forming the multilayer panel of FIG. 1 using the method of FIG. 8.

Referring again to FIGS. 2B and 2C, the first lofted sheet 94 may be inserted into a mold 102 including at least one mold surface 104, 124 (see FIG. 9). Additional material layers are positioned sequentially relative to the first lofted sheet 94 in the mold 102, as shown in FIG. 2B, including the core insert 28, the second lofted sheet 96, and the exterior cover layer 84, and compression molded using the mold 102 to form the multilayer panel 22 of FIG. 2C. Heating of the first and second unlofted sheets 90, 92 to loft the polymer composite 88 may concurrently preheat the resulting first and second lofted sheets 94, 96 for molding, e.g., prior to insertion of these into the mold 102.

The mold 102 may include, for example, a first mold surface 104 configured to define the interior surface 44 of the multilayer panel 22 and a second mold surface 124 configured to define the exterior surface 46 of the multilayer panel 22. The first and second mold surfaces 104, 124 may be arranged and/or aligned in the mold 102 as opposing mold surfaces 104, 124, such that upon closing the mold 102 to form the multilayer panel 22, the interior cover layer 82 is in contact with, e.g., interfaces with the first mold surface 104 and the exterior cover layer 84 interfaces with, e.g., is in contact with the second mold surface 124. During molding the mold 102 is closed such that the opposing first and second mold surfaces 104, 124 exert a forming pressure P on the layered materials as shown in FIG. 2B to form one or more features of the multilayer panel 22 including, for example, the one or more recesses 50, the peripheral portion 30, the peripheral channel 42, the hinged portion 70, etc. The multilayer panel 22 may be formed, for example, using compression molding or a similar thermoforming process, which may include vacuum forming of the multilayer panel 22. The mold 102 may be heated such that the first and second mold surfaces 104, 124 are heated to a mold temperature defined by a molding temperature of the polymer composite 88 and/or as required to form the multilayer panel 22.

During compression molding of the multilayer panel 22, the first and second lofted sheets 94, 96 are compressed to form, respectively, the first and second molded layers 24, 26 of the multilayer panel 22, wherein each of the first and second molded layers 24, 26 is characterized by a molded polymeric structure (not shown) resultant from compression of the first and second lofted layers 94, 96 during molding to form the first molded layer 24. During molding of the molded multilayer panel 22, the polymer composite 88 of the lofted sheets 94, 96 is compressed as the lofted sheets 94, 96 are compressed to the molded thickness TM, to form the first and second molded layers 24, 26, and concurrently the polymer composite 88 is compressed in conformance with the mold surfaces 104, 124, such that the chopped fibers in polymer composite 88 are oriented relative to the mold surfaces 104, 124, e.g., are compressed and oriented relative to the surfaces of the one or more recesses 50, the peripheral portion 30, the peripheral channel 42, the hinged portion 70, etc. defined by the mold surfaces 104, 124. The chopped fibers in their compressed and oriented state are constrained in the thermoplastic matrix defined by the first and second molded layers 24, 26 such that the compressed and constrained chopped fibers in the first molded layer 24 may have an orientation corresponding to the profile and/or shape of the interior surface 44 and defining a first oriented polymeric structure of the first molded layer 24, and such that the compressed and constrained chopped fibers in the second molded layer 26 may have an orientation corresponding to the profile and/or shape of the exterior surface 46 and defining a second oriented polymeric structure of the second layer. The molded thickness TM of each of the first and second molded layers 24, 26 may be, by way of non-limiting example, less than the thickness of the respective first and second unlofted sheets 90, 92, indicating a more compressed and/or constrained orientation of the chopped fibers in the molded state than in the unlofted state, and such that the density of the first and second molded layers 24, 26 may be greater than the density of the respective first and second unlofted sheets 90, 92. The ratio of the molded thickness TM to the unlofted thickness TU may be less than one, such that the lofted sheet may be compressed during molding to produce a molded layer having a molded thickness TM<TU. In one example, the ratio of the molded thickness TM to the unlofted thickness TU may be 0.8, such that an unlofted sheet having an unlofted thickness TU, for example, of 2.5 mm may, after lofting and molding, provide a molded layer having a molded thickness TM of 2 mm.

Referring now to FIGS. 4, 5 and 7, shown is a cross-sectional view of the peripheral portion 30 of the multilayer panel 22. The peripheral portion 30 surrounds the central portion 40 of the multilayer panel 22 to define the peripheral edge 38 of the multilayer panel 22. The peripheral portion 30 is formed integrally with the central portion 40 and includes a flange 32 extending from the central portion 40 of the multilayer panel 22 which is configured to interface with the structure interface portion 16 of the structure opening 18 with the multilayer panel 22 in an installed position. The peripheral portion 30 may include a peripheral channel 42 defined by the flange 32 and the central portion 40 and configured to increase the rigidity of the peripheral portion 30. The core insert 28 may not extend into the peripheral portion 30, such that the peripheral portion 30 may be characterized by the first and second molded layers 24, 26 bonded directly to each other as shown in FIGS. 4, 6 and 7.

The flange 32 may include a shoulder portion 34 and a rim portion 36, where the shoulder portion 34 is intermediate the rim portion 36 and the central portion 40 of the multilayer panel 22. The flange 32 and peripheral channel 42 may be configured such that the rim portion 36 of the flange 32 can be inserted into a groove (not shown) defined by the structure interface portion 16, and/or the flange 32 may be configured to conform to the structure interface portion 16. The structure interface portion 16 and/or the peripheral portion 30 may be configured such that when the multilayer panel 22 is in the installed position as shown in FIG. 4, the exterior surface 46 of the central portion 40 of the multilayer panel 22 is substantially flush with the structure surface 14. Also shown in FIG. 4, the interior surface 44 of the central portion 40 of the multilayer panel 22 is configured to be substantially flush with a supporting portion 66 of the structure interface portion 16, such that the multilayer panel 22 does not protrude or extend into the compartment 60 defined by the compartment surface 62. The structure interface portion 16, as shown in FIG. 4, may be intermediate the structure surface 14 and the compartment surface 62, and may be formed integrally with the structure surface 14 and/or the compartment surface 62.

The rim portion 36 of the flange 32 may terminate in a flange 32 edge configured to be positioned in contact with the supporting portion 66 of the structure interface portion 16, such that the multilayer panel 22 can be supported by and/or retained in the installed position in the structure opening 18 via the flange 32 edge in contact with the supporting portion 66. In one example, the supporting portion 66 of the structure interface portion 16 is configured as a ledge or step, upon which the flange 32 edge sits. The flange 32 may be configured such that in the installed position the flange 32 edge, which may be the sheared edge formed by trimming the multilayer panel 22 from offal 98 (see FIG. 9) produced during forming, is not visible from outside the compartment 60. The flange 32 may be configured such that the exterior surface 46 of the central portion 40 and exterior surface 46 of the flange 32 shoulder portion 34 are formed of the same material to provide a uniform and consistent appearance with the adjacent structure interface portion 16. The mold 102 and/or mold surfaces 104, 124 may be configured to trim or shear waste material 98, e.g., offal 98, away from the multilayer panel 22 during molding. The offal 98 may include material layers extending beyond the peripheral edge 38 of the multilayer panel 22, which may include, for example, waste material 98 trimmed from the first and second molded layers 24, 26, the core insert 28, and/or the interior and exterior cover layers 82, 84 to form the peripheral edge 38. As shown in FIGS. 4, 6 and 7, the peripheral portion 30 may be configured such that the core insert 28 does not extend into the peripheral portion 30, such that in the peripheral portion 30, the first molded layer 24 is bonded directly to the second molded layer 26 to increase the rigidity of the peripheral portion 30.

The multilayer panel 22 may be configured as a low profile panel, which in one example is characterized as a panel having an overall thickness TO shown in FIG. 4 no greater than one inch or 25.4 mm. The low profile panel is configured to minimize intrusion of the panel interior surface 44 into the compartment 60 enclosed by the panel, thereby optimizing the usable compartment 60 space defined by the compartment 60. In a non-limiting example, referring to FIG. 4, the multilayer panel 22 may be configured as a low profile panel including a core insert 28 having a nominal core thickness TC of 17 mm, first and second molded layers 24, 26 each having a nominal molded thickness TM of 2 mm, an interior cover layer 82 having a nominal thickness TS of less than 0.5 mm and an exterior cover layer 84 having a nominal thickness TA of 3.5 mm such that the nominal overall thickness TO of the multilayer panel 22 is 25 mm.

The multilayer panel 22 may be configured as a lightweight load bearing panel, such that the multilayer panel 22 is configured to withstand a bending and deflection force which may be imposed by items which may be placed on the multilayer panel 22, or by a force imposed against the multilayer panel 22 in the direction generally indicated by the arrow F shown in FIG. 4, e.g., normal to the exterior surface 46 of the multilayer panel 22. For example, a vehicle 10 user standing, sitting, or kneeling on the multilayer panel 22 may impose a load generally referred to as a knee load, which must be withstood by the multilayer panel 22. In one example, the multilayer panel 22 may be configured to withstand a minimum knee loading requirement for a vehicle 10 floor panel 12, such that the multilayer panel 22 is configured to withstand a knee load of at least 250 pounds applied with a 75 mm disk load in the direction of the force arrow F shown in FIG. 4 to the central portion 40 of the multilayer panel 22, such that deflection of the multilayer panel 22 in the direction of the point load does not exceed 10 mm during loading, and permanent deflection of the multilayer panel 22 after loading to 250 pounds does not exceed 5 mm.

Figure 3B:
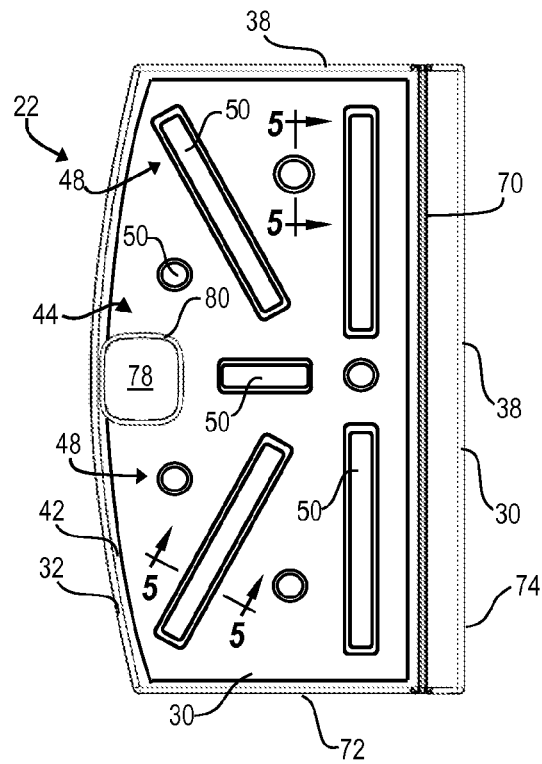
FIG. 3B is a schematic bottom view of an inner side of the multilayer panel of FIG. 3A.

As shown in FIG. 3B and FIG. 5, the multilayer panel 22 may define one or more recessed portions 48, each including a base portion 52 and a wall portion 54 collectively defining a recess 50. One or more recesses 50 may be configured to increase the load bearing capacity and/or the rigidity of the multilayer panel 22, and/or for weight reduction of the multilayer panel 22. One or more of recesses 50 defined by the recessed portions 48 may have a frusto-polyhedral or frusto-conical shape, e.g., may be shaped as a truncated circular or elliptical cone, a truncated square or regular pyramidal, or other polyhedral or conical shape to provide a recessed portion 48 defining a base and a wall portion 52, 54. The multilayer panel 22 may include a plurality of recessed portions 48 distributed throughout the central portion 40 of the multilayer panel 22. At least one of the plurality of recessed portions 48 may be shaped differently from another of the recessed portions 48, as shown in FIG. 3B. The plurality of recessed portions 48 may be distributed in a perpendicular, skew, orthogonal, non-orthogonal, parallel, and/or non-parallel arrangement, or a combination of these. The wall portion 54 may be tapered for strength considerations and/or to provide a draft angle 56 to facilitate material flow during molding of the multilayer panel 22 and/or removal of the multilayer panel 22 from the mold 102 after molding. As described previously, the core insert 28 may define an opening 18 such that the core insert 28 does not extend between the first layer and the second layer of the base portion 52 defining the recess 50, e.g., the core insert 28 may be discontinuous at the base portion 52 such that the base portion 52 of the recess 50 may be characterized by the first and second layer which are directly bonded to each other.

As shown in FIGS. 1, 3A-3B and in additional detail in FIG. 7, the multilayer panel 22 may define a hinged portion 70 connecting a first panel portion 72 of the multilayer panel 22 to a second panel portion 74 of the multilayer panel 22, such that the panel portions 72, 74 are movable relative to each other about the hinged portion 70. The hinged portion 70 includes at least one hinge 76, which may be integrally formed with the first and second panel portions 72, 74 connected by the hinged portion 70, such that the hinge 76 is configured as a living hinge 76. The hinged portion 70 is formed by compression molding of the first and second lofted layers 90, 92 between the interior and exterior cover layers 82, 84, such that the hinge 76 is characterized by a hinge thickness TH which is substantially thinner than the sum of the thicknesses, e.g., TM+TM (see FIG. 4) of the first and second molded layers 94, 96 immediately adjacent the hinged portion 70. In one example, the nominal thickness TM of each of the first and second molded layers 94, 96 immediately adjacent the hinged portion 70 is 2.0 mm, and the thickness TH of the hinge 76 ranges from 0.5 mm to 1.0 mm, such that the compressed height TH of the hinge 76 is approximately 25% of the compressed total height (TM+TM) of the first and second molded layers 94, 96. The hinge 76 is therefore characterized by a polymeric structure having a compressed glass fiber structure which is substantially denser than the central portion 40 of the multilayer panel 22, thus providing increased strength and/or bending fatigue resistance to the hinge 76 and hinged portion 70.

Each hinged portion 70 may define a plurality of hinges 76 separated by a bridge portion 73, where the bridge portion 73 is characterized by a thickness TB, which, in the example shown, is thicker than the hinge thickness TH and thinner than the compressed total height (TM+TM) of the first and second molded layers 94, 96 adjacent the hinged portion, such that the bridge 73 has a compressed glass fiber structure which provides increased strength and/or bending fatigue resistance to the hinged portion 70. The plurality of hinges 76 included in a hinged portion 70 may be substantially parallel to each other to provide multiple hinge 76 points about which the panel portions 72, 74 hingedly connected to the hinge 76 portion are moveable. The multilayer panel 22 may include a plurality of hinged portions 70 and a plurality of panel portions 72, 74. By way of non-limiting example, the multilayer panel 22 may include three panel portions 72, 74 and two hinged portions 70, wherein a first hinged portion 70 is configured to hingedly connect a first and second panel portion 72, 74 and a second hinged portion 70 is configured to connect a second and third hinged portion (not shown).

As shown in FIGS. 1, 3A-3B and in additional detail in FIG. 7, the multilayer panel 22 may include one or more apertures 78, each aperture 78 defined by an aperture lip 80 formed during molding of the multilayer panel 22. The mold 102 and/or mold surfaces 104, 124 may be configured to remove trim or shear waste material 98 from portions of the multilayer panel 22 during molding of the multilayer panel 22 to form the aperture 78 while compressing the material layers to form the aperture lip 80. The aperture 78 may be configured to receive a panel detail 58 such as a handle 68, a latch, a strap, a clip, a fastener, a hold-down, a d-ring, etc., where the panel detail 58 may be operatively attached to the multilayer panel 22 via the aperture 78 to form a panel assembly 20. By way of non-limiting example, the aperture 78 shown in FIG. 7 includes a panel detail 58 configured as a handle 68 for lifting or moving the panel assembly 20 to access the compartment 60, for example, during stowage of a retractable seat (not shown) into the compartment 60, or retrieval of the stowed seat therefrom. The panel assembly 20 may further include one or more panel details 58 operatively attached to the multilayer panel 22 to form the panel assembly 20, which may be functional, e.g., handles 68, clips, fasteners, hold-downs, etc., or non-functional, e.g., decorative trim and trim components, which may be operatively attached via an aperture 78 or to another feature of the multilayer panel 22.

Figure 8:
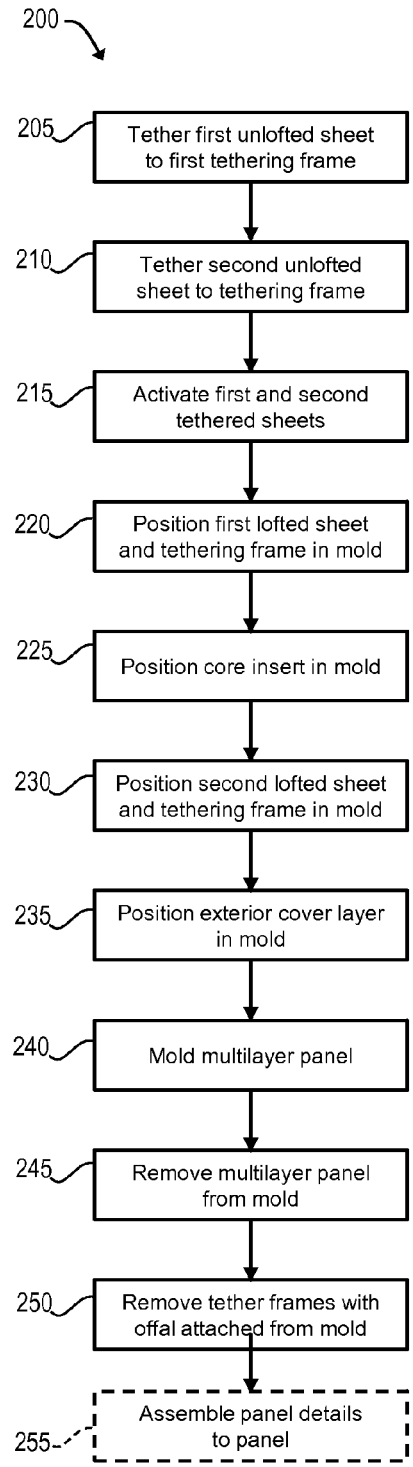
FIG. 8 is a schematic flow chart of a method of forming the multilayer panel of FIG. 1.

A method 200 and system 100 for making the multilayer panel 22 is shown in FIGS. 8 and 9, respectively. The system 100 shown in FIG. 9 includes a tethering frame 108 having a frame portion 106 configured to retain an unlofted sheet, which may be one of a first unlofted sheet 90 and a second unlofted sheet 92, to the frame portion 106 in a tethered condition, such that the tethered unlofted sheet is substantially parallel to the plane of the frame portion 106 and/or such that the sheet is suspended above a surface upon which the tethering frame 108 is placed. The surface may be a conveyor surface 110 of a conveyor 112 configured to convey the tethering frames 108 through an oven 122, as shown in FIG. 9. The oven 122 may be configured, by way of non-limiting example, as a continuous flow oven 122. As shown in detail in FIGS. 10A-10B, the frame portion 106 may include a plurality of tethering elements 120 configured to tether, e.g., to attach the unlofted sheet to the tethering frame 108 in the tethered condition. By way of non-limiting example, the tethering elements 120 may be configured as hooks, protrusions, spikes, barbs, prongs, clips, etc. or a combination of these, such that the unlofted sheet is readily attachable to the tethering element 120 and is retained in position, and the lofted sheet and/or the molded layer subsequently formed from the unlofted sheet is readily removable from the tethering element 120. The tethering elements 120 may be configured such that the unlofted sheet 90, 92 and lofted sheet 94, 96 formed therefrom may be retained with a nominal level of tension or stretch, e.g., with sufficient tension or stretch in the unlofted and lofted sheet when retained to the frame such that sagging and/or wrinkling of the unlofted and lofted sheet is minimized and/or substantially eliminated and such that the lofted sheet 94, 96 is smoothly extended over the frame portion 106 when the tethering frame 108 including the lofted sheet 94, 96 suspended thereon is inserted into the mold 102.

The unlofted sheet 90, 92 may be configured for attachment to the tethering elements 120. For example, the unlofted sheet 90, 92 may include one or more attachment features 126 configured to interface with and/or be attached to the tethering elements 120 of the tethering frame 108. By way of non-limiting example, the unlofted sheet 90, 92 may be perforated along one or more edges, as shown in FIG. 9, to define a plurality of attachment features 126 configured as perforations 126 or perforated openings 126. The tethering elements 120 may be configured, for example, as prongs or hooks, such that the perforated openings 126 of the unlofted sheet 90, 92 can receive the tethering elements 120 to attach the unlofted sheet to the frame portion 106, and such that, after molding, the offal 98 can be easily unhooked and/or otherwise detached from the tethering elements 120 for removal from the tethering frame 108 and disposal and/or recycling of the offal 98.

The tethering elements 120 may be configured such that the offal 98, e.g., the waste material 98 trimmed in the mold 102 from the multilayer panel 22 during molding of the multilayer panel 22, is retained by the tethering elements 120 such that the tethering frame 108 is removable from the mold 102 after molding with the offal 98 attached thereto, as shown in FIG. 9. Retaining the offal 98 to the tethering frame 108 during removal of the tethering frame 108 from the mold 102 reduces cycle time by consolidating frame removal and offal 98 removal into a single step, and by allowing off-line removal of the offal 98 from the tethering frame 108 such that mold 102 capacity (available molding time) that would be consumed removing the offal 98 and the tethering frame 108 from the mold 102 in separate steps is not lost.

The tethering frame 108 is configured to be conveyed through the oven 122 or otherwise heated concurrently with the unlofted sheet 90, 92 thereto, to be heated to a sufficient temperature to cause lofting of the unlofted sheet 90, 92 into a lofted sheet 94, 96. The temperature maintained by the oven 122 corresponds to a lofting temperature, which may also be referred to herein as an activation temperature, defined by the loftable polymeric composite comprising the unlofted sheet 90, 92, which may be a temperature less than a melting temperature of the polymeric composite. The activation temperature to which the oven 122 is heated may be sufficient to activate an adhesive 86 on one or more sides of the sheet being lofted. The oven 122, oven 122 temperature, and conveyor 112 speed may be configured such that at the time the tethering frame 108 exits the oven 122, the sheet tethered to the frame portion 106 is in a lofted condition, e.g., is a lofted sheet 94, 96, the adhesive 86 has been activated, and the lofted sheet 94, 96 is preheated in preparation for molding. The tethering frame 108 may be comprised of any material suitable to maintain its configuration and rigidity and function as a tethering frame 108 during conveyance through the oven 122 and/or in the mold 102 during the molding process. By way of non-limiting example, the tethering frame 108 may be made from one or more metallic materials such including aluminum-based materials and steel based materials.

Figure 10A:
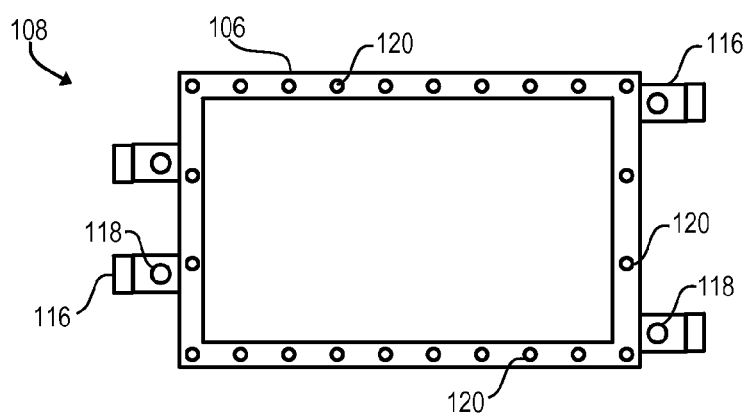
FIG. 10A is a schematic top view of a tethering frame of the system of FIG. 9.
Figure 10B:
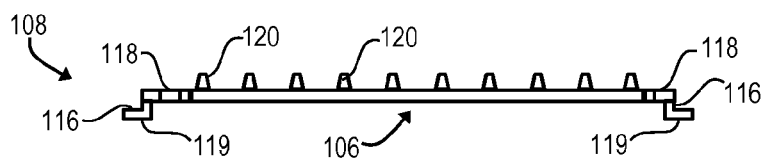
FIG. 10B is a schematic side view of the tethering frame of FIG. 10A.

As shown in FIGS. 10A-10B, the tethering frame 108 may include one or more frame members 116 configured to position the tethering frame 108 relative to at least one of the conveyor 112, the mold 102, and a mold surface 104, 124. The frame member 116 may include a pad 119 configured to interface with the conveyor surface 110 of the conveyor 112. The conveyor 112 may be made of wire mesh or be otherwise perforated or define openings therethrough (not shown) to allow heated air to flow through the conveyor 112 and through the conveyor surface 110 in the oven 122. The bottom surface of each pad 119 is sized to extend across multiple openings in the wire mesh of the conveyor surface 110 and/or otherwise sized and configured such that the frame members 116 do not catch or snag the conveyor surface 110, thereby facilitating movement of the tethering frame 108 on the conveyor surface 110 during loading and unloading. For example, the pads 119 may have a substantially flat bottom surface and/or be void of sharp edges or corners such that the pads 119 slidably interface with the conveyor surface 110 to allow sliding of the tethering frame 108 relative to the conveyor surface 110 during loading and unloading of the tethering frame 108 from the oven 122.

The frame members 116 may be configured to elevate the frame portion 106 of the tethering frame 108 above the conveyor surface 110 of the conveyor 112, such that the frame portion 106 and the unlofted sheet tethered thereto is suspended above the conveyor surface 110 when the tethering frame 108 is conveyed into the oven 122 and such that the top and bottom surfaces of the sheet are not in contact with the conveyor surface 110. By suspending the unlofted sheet 90, 92 tethered to the tethering frame 108 above the conveyor surface 110, heated air in the oven 122 can circulate between the unlofted sheet 90, 92 and the conveyor surface 110 and flow across the surfaces of the sheet in the oven 122 to heat the sheet during lofting and/or to activate the adhesive 86. Circulating the heated air across all sheet surfaces increases the efficiency of the lofting process and activation of the adhesive 86, and provides a lofted sheet 94, 96 which remains tethered to the frame portion 106 and an activated adhesive 86 surface which is not in contact with another surface prior to placement of the lofted sheet 94, 96 in the mold 102. The frame members 116 may be formed integrally with the frame portion 106 or may be operatively attached to the frame portion 106. The tethering frame 108 may be configured such that the frame members 116 may be repositionable relative to and/or detachable from the frame portion 106.

The tethering frame 108 may be configured such that the tethering frame 108, including the lofted sheet 94, 96 attached to the frame portion 106, can be transferred directly from the oven 122 into the mold 102, as shown in FIG. 9. The frame portion 106 or one or more of the frame members 116 may include an orienting feature 118 configured to orient the tethering frame 108 and the lofted sheet 94, 96 tethered thereto relative to the mold 102 and/or a mold surface 104, 124. The mold 102 and/or mold surface 104, 124 may include a corresponding mold feature (not shown) configured to interface with the orienting feature 118 to position the tethering frame 108 relative to the mold surface 104, 124. The tethering frame 108 may be configured, as shown in FIG. 9, such that a first tethering frame 108 is stackable relative to a second tethering frame 108, such that the first and second tethering frames 108 can be inserted into the mold 102 and stacked relative to each other. The first and second tethering frames 108 may be of the same configuration and stackable, for example, by orienting the position of the first frame relative to the second frame in the mold 102 and/or off-line (out of the mold 102) for space efficient storage and/or transport of the tethering frames 108.

A method 200 of making the multilayer panel 22 is shown in FIG. 8 and further illustrated in FIG. 9. The method 200 includes a step 205, wherein a first unlofted sheet 90 is tethered to a first tethering frame 108. The first unlofted sheet 90 may be provided in a predetermined size or shape, or may, for example, be cut from roll stock (not shown) to a predetermined size or shape. As described previously, the first unlofted sheet 90 may define one or more attachment features 126 configured to interface with and/or be attachable to the tethering elements 120 of the frame portion 106 for attachment of the first unlofted sheet 90 to the tethering frame 108. The first unlofted sheet 90 may be characterized by an unlofted thickness TU configured to be lofted to provide a first lofted sheet 94 having a lofted thickness TL suitable for compression during molding to form the first layer of the multilayer panel 22 having a molded thickness TM. The first unlofted sheet 90 may include a heat activated adhesive 86 and/or have an adhesive film 86 applied to one surface of the first unlofted sheet 90 and may include an interior cover layer 82 bonded to or otherwise adhered to the opposing surface of the first unlofted sheet 90. The first unlofted sheet 90 including the interior cover layer 82 is tethered to a tethering frame 108 such that the interior cover layer 82 is adjacent to the frame portion 106, e.g., such that the interior cover layer 82 is in contact with the frame portion 106, and such that the adhesive 86 is non-adjacent the frame portion 106, e.g., is facing upward when the first unlofted sheet 90 is tethered to the tethering frame 108 and the tethering frame 108 is placed on the oven conveyor 112.

At step 210, a second unlofted sheet 92 is tethered to a second tethering frame 108. The second unlofted sheet 92 may be provided in a predetermined size or shape, or may, for example, be cut from roll stock (not shown) to a predetermined size or shape. As described previously, the second unlofted sheet 92 may define one or more attachment features 126 configured to interface with and/or be attachable to the tethering elements 120 of the frame portion 106 for attachment of the second unlofted sheet 92 to the second tethering frame 108. The second unlofted sheet 92 may be characterized by an unlofted thickness TU configured to be lofted to provide a second lofted sheet 96 having a lofted thickness TL suitable for compression during molding to form the second layer of the multilayer panel 22 having a molded thickness TM.

The second unlofted sheet 92 may include a heat activated adhesive and/or have an adhesive film 86 applied to at least one surface of the second unlofted sheet 92. In one example, a first adhesive film 86 is applied to a first side of the second unlofted sheet 92, and a second adhesive film 86 is applied to the second or opposing side of the second unlofted sheet 92. The second adhesive film 86 may be perforated to define a plurality of openings 87, such that air may flow or vent through the second adhesive film 86 during lofting of the second unlofted sheet 92 to form the second lofted sheet 96, and/or during compression of the second lofted sheet 96 to form the second molded layer 26 during molding of the multilayer panel 22. The second unlofted sheet 92 including the first and second adhesive films 86 is tethered to the tethering frame 108 such that the first side and the first adhesive film 86 is adjacent to the frame portion 106, e.g., such that the first adhesive film 86 is in contact with the frame portion 106, and such that the second side and second perforated adhesive film 86 is non-adjacent the frame portion 106, e.g., the second side is facing upward when the second unlofted sheet 92 is tethered to the tethering frame 108 and the tethering frame 108 is placed on the oven conveyor 112.

The method 200 at step 215 includes activating the first and second tethered unlofted sheets 90, 92, wherein activating each of the first and second unlofted sheets 90, 92 includes heating each of the first and second unlofted sheets 90, 92, which in the example shown may be accomplished by heating the first and second unlofted sheets 90, 92 tethered to their respective tethering frame 108 using an oven 122, such as the continuous flow oven 122 shown in FIG. 9, to loft the polymer composite 88 and thermally activate the adhesive 86 of each of the unlofted sheets 90, 92 and to preheat each of the lofted sheets 94, 96 in preparation for molding. The example of a continuous flow oven 122 is intended to be non-limiting, and it would be understood that other methods 200 of heating the tethered unlofted sheets 90, 92 may be used. As shown in FIG. 9, the first and second unlofted sheets 90, 92 may be tethered to their respective tethering frames 108, then introduced to the oven 122 in alternating sequence, e.g., such that a first tethering frame 108 including a first unlofted sheet 90 is loaded onto the conveyor 112 followed by a second tethering frame 108 including a second unlofted sheet 92, followed by a third tethering frame 108 including a first unlofted sheet 90 and a fourth tethering frame 108 including a second unlofted sheet 92, and so on, such that the tethering frames 108 exit the oven 122 including lofted sheets 94, 96 in the order required for loading into the mold 102 for molding of the multilayer panel 22. The oven 122 may be configured to control the oven temperature at a temperature corresponding to the lofting temperature of the polymer composite 88 and sufficient to activate the adhesive 86. In the example shown in FIG. 9, the first lofted sheet 94 attached to the first tethering mold 102 (indicated in FIG. 9 by the arrow marked) exits the oven 122 followed by a second lofted sheet 96 attached to the second tethering mold 102 (indicated in FIG. 9 by the arrow marked), in the sequential order required for insertion into the mold 102 to form the multilayer panel 22 according to the example method 200 of FIG. 8.

At step 220, the tethering frame 108 with the first lofted sheet 94 attached is inserted into the mold 102 and positioned such that the interior cover layer 82 is adjacent to the first mold surface 104. As described previously, one or more orienting features 118 defined by the first tethering frame 108 may be aligned with or otherwise interface with one or more corresponding mold features (not shown) to position the first tethering frame 108, the attached first lofted layer 94, and the interior cover layer 82 relative to the first mold surface 104. At step 225 a core insert 28, which may be a foam insert configured as described previously herein, is inserted into the mold 102 adjacent the first lofted layer 94 as illustrated by FIG. 2B, such that the core insert 28 is in contact with the adhesive 86 of the first lofted layer 94. The core insert 28 may be aligned relative to the first mold surface 104 and/or to one or more mold features (not shown) to position the core insert 28 relative to the first mold surface 104, such that features of the multilayer panel 22 defined by the first mold surface 104 such as recesses 50 and/or apertures 78 are aligned with openings and/or thinned portions of the core insert 28 (not shown) corresponding to those same features 50, 78.

At step 230, the second tethering frame 108 including the attached second lofted layer 96 is inserted into the mold 102 adjacent the core insert 28 as illustrated in FIG. 2B, such that the first side of the second lofted layer 96 and the adhesive 86 thereon is adjacent the core insert 28. As described previously, one or more orienting features 118 defined by the second tethering frame 108 may be aligned with or otherwise interface with one or more corresponding mold features (not shown) to position the second tethering frame 108 and the attached second lofted layer 96 relative to the first mold surface 104, the core insert 28, and the first tethering frame 108. At step 235 an exterior cover layer 84, which may be an appearance layer 84 configured as described previously herein, is inserted into the mold 102 adjacent the second lofted layer 96 as illustrated by FIG. 2B, such that the exterior cover layer 84 is in contact with the second side of the second lofted layer 96 and the perforated adhesive 86 thereon. The exterior cover layer 84 may be aligned relative to the first mold surface and/or to one or more mold features (not shown) to position the exterior cover layer 84 relative to the first mold surface 104 and to the second mold surface 124 aligned to the first mold surface 104, such that the exterior surface 46 defined by the exterior surface 46 layer is facing the second mold surface 124 during molding of the multilayer panel 22.

At step 240, the multilayer panel 22 is molded, for example, by closing the mold 102 and activating a compression molding cycle which includes bringing the opposing first and second mold surfaces 104, 124 together in an aligned manner to exert a forming pressure P on the layered materials as shown in FIG. 2B to form one or more features of the multilayer panel 22 including, for example, the one or more recesses 50, the peripheral portion 30, the peripheral channel 42, the hinged portion 70, etc. The mold 102 may be heated such that the first and second mold surfaces 104, 124 are heated to a mold temperature defined by a molding temperature of the polymer composite 88 and/or as required to form the multilayer panel 22. The mold 102 may include a trim feature (not shown) such that the offal 98 is trimmed from the multilayer panel 22 such that the offal 98 remains attached to one or the other of the tethering frames 108. The trim feature may be configured such that at least the interior and exterior cover layers 82, 84 and the first and second molded layers 24, 26 are trimmed by closure of the mold 102 to form the perimeter edge of the multilayer panel 22. The compression molding cycle may include a cure and/or cooling cycle. By way of non-limiting example, the compression molding cycle may have a total cycle time of 60 seconds or less.

During the compression molding cycle, each of the first and second lofted sheets 94, 96 is compressed from a lofted thickness TL to a molded thickness TM to form the respective first and second molded layers 24, 26, such that the molded thickness TM of the molded layer is less than the unlofted thickness TU of the unlofted sheet from which that molded layer is formed, e.g., such that the ratio of the molded thickness TM to the unlofted thickness TU is less than one, the density of the molded layer 24, 26 is greater than the density of the unlofted sheet 90, 92 from which the molded layer was formed. In a non-limiting example, the ratio of the molded thickness TM to the unlofted thickness TU may be 0.8. During the compression molding cycle, the first and second lofted sheets 94, 96 are compressed and the first and second molded layers 24, 26 formed therefrom are bonded to the core insert 28. The core insert 28 does not substantially extend into the interface between the first and second molded layers 24, 26 in some portions of the multilayer panel 22 such as the peripheral portion 30, the hinged portion(s) 70 and the base portions 52 of the recessed portions 48, such that in these portions 30, 52, 70, the first and second lofted layers 94, 96 are compressed to form the first and second molded layers 24, 26 defining these portions 30, 52, 70 and the first and second molded layers 24, 26 in these portions 30, 52, 70 are bonded directly to each other.

Compression of the first lofted layer 94 relative to the first mold surface 104 produces a first molded layer 24 characterized by a first oriented polymeric structure as previously described herein, where the orientation of the reinforcing fibers in the first oriented polymeric structure is at least partially defined by the shape of the interior surface 44 of the multilayer panel 22 including, for example, the shape of the recessed portions 48, the hinged portion(s) 70 and peripheral portion 30 defined by the interior surface 44. Compression of the second lofted layer 96 relative to the second mold surface 124 produces a second molded layer 26 characterized by a second oriented polymeric structure as previously described herein, where the orientation of the reinforcing fibers in the second oriented polymeric structure is at least partially defined by the shape of the exterior surface 46 of the multilayer panel 22 including, for example, the shape of the hinged portion(s) 70 and peripheral portion 30 defined by the exterior surface 46. During compression of the second lofted layer 96, heated air is uniformly dissipated through the plurality of openings 87 defined by the second adhesive film 86 as the exterior cover layer 84 is bonded to the second molded layer 26.

At step 245, the trimmed and formed multilayer panel 22 is removed from the mold 102. The formed multilayer panel 22 may be further processed. For example, trim components and/or other such panel details 58, such as fasteners, latches, straps, clips, handles 68, d-rings, hold-downs, etc. may be attached or applied to the multilayer panel 22 at step 255 to form the panel assembly 20.

At step 250, the first and second tethering frames 108, including the offal 98 attached to the tethering frames 108, are removed from the mold 102. During the compression molding cycle the exterior cover layer 84 is bonded to the second molded layer 26 such that waste material 98, e.g., offal 98 trimmed from the exterior cover layer 84 during trimming of the multilayer panel 22, may be bonded to or otherwise adhered to the offal 98 trimmed from the second molded layer 26 and attached to the second tethering frame 108. As such, the offal 98 trimmed from the multilayer panel 22, including offal 98 from the first and second molded layer 24, 26 and the interior and exterior cover layers 82, 84, remains attached to the tethering frames 108 and can be removed concurrently with the tethering frames 108 from the mold 102, reducing the time required to clear these materials from the mold 102 to prepare the mold 102 for the next compression molding cycle.

As shown in FIG. 9, after removal of the tethering frames 108 from the mold 102 the offal 98 can be removed from the tethering frames 108 for disposal and/or recycling, for example, by detaching the first and second molded layers 24, 26 from the tethering elements 120. The tethering frames 108 can be recycled for reuse for a subsequent compression molding cycle, as shown in FIG. 9. In the example shown, the tethering frames 108 are all of the same configuration such that any tethering frame 108 can be used to tether either a first unlofted sheet 90 or a second unlofted sheet 92, thus reducing the total number of tethering frames 108 required to provide a sufficient number of frames to support a continuous production flow as shown in FIG. 9. The example shown is non-limiting, and more than one configuration of tethering frame 108 may be used, including a first configuration configured to tether the first unlofted sheet 90 and a second configuration configured to tether the second unlofted sheet 92, wherein the difference in the first and second configuration may be dimensional and/or may be in the type of tethering elements 120 used by each tethering frame 108. The first and second configurations of tethering frames 108 may be configured to stack, nest and/or be oriented to each other in the mold 102 during forming.

Figure 11:
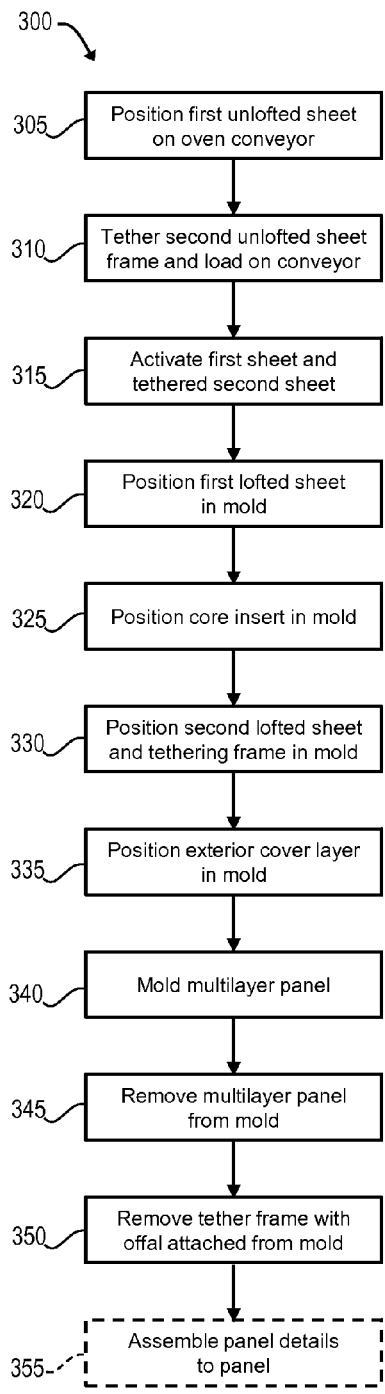
FIG. 11 is a schematic flow chart of an alternative method of forming the multilayer panel of FIG. 1.
Figure 12:
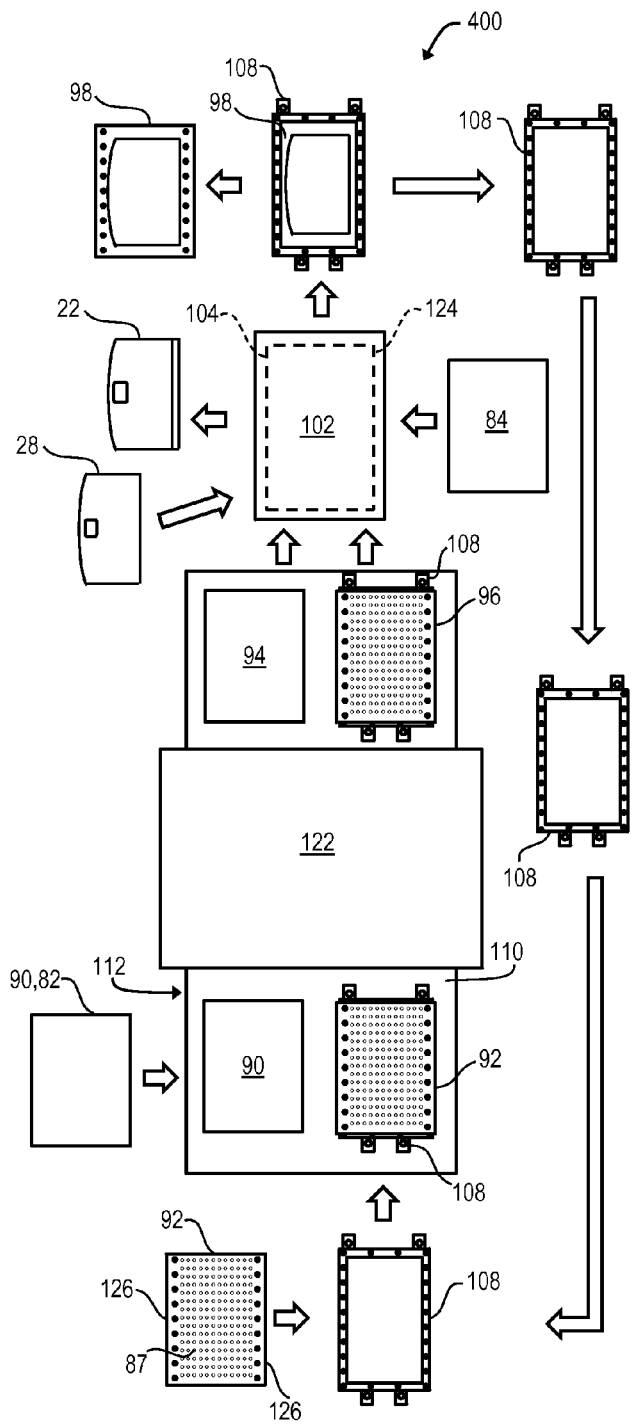
FIG. 12 is a schematic illustration of a system for forming the multilayer panel of FIG. 1 using the alternative method shown in FIG. 11.

Another example of a method 300 of making the multilayer panel 22 is shown in FIG. 11 and further illustrated by the system 400 shown in FIG. 12. The method 300 includes a step 305, wherein a first unlofted sheet 90 is loaded to a conveyor 112 for transport through a furnace 122. The first unlofted sheet 90 may be provided in a predetermined size or shape, or may, for example, be cut from roll stock (not shown) to a predetermined size or shape. The first unlofted sheet 90 may be characterized by an unlofted thickness TU configured to be lofted to provide a first lofted sheet 94 having a lofted thickness TL suitable for compression during molding to form the first layer of the multilayer panel 22 having a molded thickness TM. The first unlofted sheet 90 may include a heat activated adhesive 86 and/or have an adhesive film 86 applied to one surface of the first unlofted sheet 90 and may include an interior cover layer 82 bonded to or otherwise adhered to the opposing surface of the first unlofted sheet 90. The first unlofted sheet 90, including the interior cover layer 82, may be placed directly on the conveyor 112 such that the interior cover layer 82 is in contact with the conveyor surface 110, and such that the adhesive 86 is non-adjacent the conveyor surface 112, e.g., is facing upward when the first unlofted sheet 90 is placed on the oven conveyor 112.

At step 310, a second unlofted sheet 92 is tethered to a tethering frame 108. The second unlofted sheet 92 may be provided in a predetermined size or shape, or may, for example, be cut from roll stock (not shown) to a predetermined size or shape. As described previously, the second unlofted sheet 92 may define one or more attachment features 126 configured to interface with and/or be attachable to the tethering elements 120 of the frame portion 106 for attachment of the second unlofted sheet 92 to the tethering frame 108. The second unlofted sheet 92 may be characterized by an unlofted thickness TU configured to be lofted to provide a second lofted sheet 96 having a lofted thickness TL suitable for compression during molding to form the second layer of the multilayer panel 22 having a molded thickness TM.

The second unlofted sheet 92 may include a heat activated adhesive and/or have an adhesive film 86 applied to at least one surface of the second unlofted sheet 92. In one example, a first adhesive film 86 is applied to a first side of the second unlofted sheet 92, and a second adhesive film 86 is applied to a second or opposing side of the second unlofted sheet 92. The second adhesive film 86 may be perforated to define a plurality of openings 87, such that air may flow or vent through the second adhesive film 86 during lofting of the second unlofted sheet 92 to form the second lofted sheet 96, and/or during compression of the second lofted sheet 96 to form the second molded layer 26 during molding of the multilayer panel 22. The second unlofted sheet 92 including the first and second adhesive films 86 is tethered to the tethering frame 108 such that the first side and the first adhesive film 86 are adjacent to the frame portion 106, e.g., such that the first adhesive film 86 is in contact with the frame portion 106, and such that the second side and second perforated adhesive film 86 are non-adjacent the frame portion 106, e.g., the second side is facing upward when the second unlofted sheet 92 is tethered to the tethering frame 108 and the tethering frame 108 is placed on the oven conveyor 112.

The method 300 at step 315 includes activating the first unlofted sheet 90 and the second tethered unlofted sheet 92, wherein activating each of the first and second unlofted sheets 90, 92 includes heating each of the first and second unlofted sheets 90, 92, which in the example shown may be accomplished by heating the first and second unlofted sheets 90, 92 using an oven 122, such as the continuous flow oven 122 shown in FIG. 12, to loft the polymer composite 88 and thermally activate the adhesive 86 of each of the unlofted sheets 90, 92 and to preheat each of the lofted sheets 94, 96 in preparation for molding. As shown in FIG. 12, the first and second unlofted sheets 90, 92 may be introduced to the oven 122 concurrently, e.g. side by side on the conveyor 112, such that a first unlofted sheet 90 and a tethering frame 108 including a second unlofted sheet 92 are conveyed through the oven 122 together and exit the oven 122 concurrently to be inserted into the mold 102. The first set of first and second sheets 90, 92 fed into the oven 122 may be followed by another set including another first unlofted sheet 90 loaded concurrently with another tethering frame 108 including a second unlofted sheet 92, and so on, such that each set of a first lofted sheet 94 and second tethered lofted sheet 96 used to form a multilayer panel 22 exit the oven 122 concurrently. The oven 122 may be configured to control the oven temperature at a temperature corresponding to the lofting temperature of the polymer composite 88 and sufficient to activate the adhesive 86.

At step 320, the first lofted sheet 94 is removed from the conveyor 112 and inserted into the mold 102 positioned such that the interior cover layer 82 is adjacent to the first mold surface 104. At step 325 a core insert 28, which may be a foam insert configured as described previously herein, is inserted into the mold 102 adjacent the first lofted layer 94 as illustrated by FIG. 2B, such that the core insert 28 is in contact with the adhesive 86 of the first lofted layer 94. The core insert 28 may be aligned relative to the first mold surface 104 and/or to one or more mold features (not shown) to position the core insert 28 relative to the first mold surface 104, such that features of the multilayer panel 22 defined by the first mold surface 104 such as recesses 50 and/or apertures 78 are aligned with openings and/or thinned portions of the core insert 28 (not shown) corresponding to those same features 50, 78.

At step 330, the tethering frame 108 including the attached second lofted layer 96 is inserted into the mold 102 adjacent the core insert 28 as illustrated in FIG. 2B, such that the first side of the second lofted layer 96 and the adhesive 86 thereon is adjacent the core insert 28, and the second side of the second lofted layer 96 and the adhesive film 86 including the plurality of openings 87 is facing away from the core insert 28. As described previously, one or more orienting features 118 defined by the tethering frame 108 may be aligned with or otherwise interface with one or more corresponding mold features (not shown) to position the second tethering frame 108 and the attached second lofted layer 96 relative to the first mold surface 104, the core insert 28 and the first lofted sheet 94. The second lofted layer 96, having exited the oven 122 concurrently with the first lofted layer 94, may have cooled slightly during insertion of the first lofted layer 94 and the core insert 28 into the mold, such that at the time the second lofted layer 96 tethered to the tethering frame 108 is inserted into the mold 102, the second lofted layer 96 may be at a lower temperature than the activation temperature.

At step 335 an exterior cover layer 84, which may be an appearance layer 84 configured as described previously herein, is inserted into the mold 102 adjacent the second lofted layer 96 as illustrated by FIG. 2B, such that the exterior cover layer 84 is in contact with the second side of the second lofted layer 96 and the perforated adhesive 86 thereon. The exterior cover layer 84 may be aligned relative to the first mold surface and/or to one or more mold features (not shown) to position the exterior cover layer 84 relative to the first mold surface 104 and to the second mold surface 124 aligned to the first mold surface 104, such that exterior surface 46 defined by the exterior surface 46 layer is facing the second mold surface 124 during molding of the multilayer panel 22.

At step 340, the multilayer panel 22 is molded, for example, by closing the mold 102 and activating a compression molding cycle which includes bringing the opposing first and second mold surfaces 104, 124 together in an aligned manner to exert a forming pressure P on the layered materials as shown in FIG. 2B to form one or more features of the multilayer panel 22 including, for example, the one or more recesses 50, the peripheral portion 30, the peripheral channel 42, the hinged portion 70, etc. The mold 102 may be heated such that the first and second mold surfaces 104, 124 are heated to a mold temperature defined by a molding temperature of the polymer composite 88 and/or as required to form the multilayer panel 22. The mold 102 may include a trim feature (not shown) such that the offal 98 is trimmed from the multilayer panel 22 such that the offal 98 remains attached to the tethering frame 108. The trim feature may be configured such that at least the interior and exterior cover layers 82, 84 and the first and second molded layers 24, 26 are trimmed by closure of the mold 102 to form the perimeter edge of the multilayer panel 22. The compression molding cycle may include a cure cycle and/or a cooling cycle. By way of non-limiting example, the compression molding cycle may have a total cycle time of 60 seconds or less.

During the compression molding cycle, each of the first and second lofted sheets 94, 96 is compressed from a lofted thickness TL to a molded thickness TM to form the respective first and second molded layers 24, 26, such that the molded thickness TM of the molded layer is less than the unlofted thickness TU of the unlofted sheet from which that molded layer is formed, e.g., such that the ratio of the molded thickness TM to the unlofted thickness TU is less than one, the density of the molded layer 24, 26 is greater than the density of the unlofted sheet 90, 92 from which the molded layer was formed. In a non-limiting example, the ratio of the molded thickness TM to the unlofted thickness TU may be 0.8. During the compression molding cycle, the first and second lofted sheets 94, 96 are compressed and the first and second molded layers 24, 26 formed therefrom are bonded to the core insert 28. The core insert 28 does not substantially extend into the interface between the first and second molded layers 24, 26 in some portions of the multilayer panel 22 such as the peripheral portion 30, the hinged portion(s) 70 and the base portions 52 of the recessed portions 48, such that in these portions 30, 52, 70, the first and second lofted layers 94, 96 are compressed to form the first and second molded layers 24, 26 defining these portions 30, 52, 70 and the first and second molded layers 24, 26 in these portions 30, 52, 70 are bonded directly to each other.

Compression of the first lofted layer 94 relative to the first mold surface 104 produces a first molded layer 24 characterized by a first oriented polymeric structure as previously described herein, where the orientation of the reinforcing fibers in the first oriented polymeric structure is at least partially defined by the shape of the interior surface 44 of the multilayer panel 22 including, for example, the shape of the recessed portions 48, the hinged portion(s) 70 and peripheral portion 30 defined by the interior surface 44. Compression of the second lofted layer 96 relative to the second mold surface 124 produces a second molded layer 26 characterized by a second oriented polymeric structure as previously described herein, where the orientation of the reinforcing fibers in the second oriented polymeric structure is at least partially defined by the shape of the exterior surface 46 of the multilayer panel 22 including, for example, the shape of the hinged portion(s) 70 and peripheral portion 30 defined by the exterior surface 46. During compression of the second lofted layer 96, heated air is uniformly dissipated through the plurality of openings 87 defined by the second adhesive film 86 as the exterior cover layer 84 is bonded to the second molded layer 26.

At step 345, the trimmed and formed multilayer panel 22 is removed from the mold 102. The formed multilayer panel 22 may be further processed. For example, trim components and/or other such panel details 58, such as fasteners, latches, straps, clips, handles 68, d-rings, etc. may be attached or applied to the multilayer panel 22 at step 355 to form the panel assembly 20.

At step 350, the tethering frame 108 including the offal 98 attached to the tethering frame 108 is removed from the mold 102. During the compression molding cycle the exterior cover layer 84 is bonded to the second molded layer 26 such that waste material 98, e.g., offal 98 trimmed from the exterior cover layer 84 during trimming of the multilayer panel 22 may be bonded to or otherwise be adhered to the offal 98 trimmed from the second molded layer 26 and attached to the tethering frame 108. As such, the offal 98 trimmed from the multilayer panel 22 including offal 98 from the first and second molded layers 24, 26 and the interior and exterior cover layers 82, 84 remains attached to the tethering frame 108 and can be removed concurrently with the tethering frame 108 from the mold 102, reducing the time required to clear these materials from the mold 102 to prepare the mold 102 for the next compression molding cycle.

As shown in FIG. 12, after removal of the tethering frame 108 from the mold 102 the offal 98 can be removed from the tethering frame 108, for example, by detaching the second molded layer 26 and attached offal 98 from the tethering elements 120, for disposal and/or recycling. The tethering frame 108 can be recycled for reuse for a subsequent compression molding cycle, as shown in FIG. 12.

The examples shown in FIGS. 1-12 are intended to be non-limiting, and it would be understood that additional configurations of the load bearing panel described herein are possible. For example, the panel assembly 20 may be configured for use other than as a floor assembly and may be configured in other than a horizontal orientation to enclose an opening 18 or compartment 60, which may require a low profile closure as provided by the panel assembly 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for forming a multilayer panel configured to enclose an opening, the method comprising:
   providing a first unlofted sheet;
   tethering a second unlofted sheet to a tethering frame;
   wherein the first and second unlofted sheets include a loftable polymer composite;
   wherein each of the first and second unlofted sheets is characterized by an unlofted thickness;
   activating the first unlofted sheet to loft the first unlofted sheet to provide a first lofted sheet with a thickness greater than the unlofted thickness;
   activating the second unlofted sheet on the tethering flame to loft the second unlofted sheet to provide a second lofted sheet with a thickness greater than the unlofted thickness tethered to the tethering frame;
   inserting the first lofted sheet in a mold such that the first lofted sheet is adjacent a first mold surface defined by the mold;
   inserting a core insert in the mold such that the core insert is layered adjacent the first lofted sheet;
   inserting the tethering flame including the second lofted sheet in the mold such that the core insert is layered between the first and second lofted sheets and the second lofted sheet is between the core insert and a second mold surface defined by the mold;
   molding the layered first lofted sheet, core insert and second lofted sheet to form a multilayer panel;
   wherein the first mold surface is configured to define an interior surface of the multilayer panel and the second mold surface is configured to define an exterior surface of the multilayer panel;
   wherein molding the multilayer panel includes moving the first and second mold surfaces toward each other to exert a forming pressure on the layered first lofted sheet, core insert, and second lofted sheet;
   wherein the forming pressure is sufficient to:
      compress the first lofted sheet to form a first molded sheet characterized by a first oriented polymeric structure corresponding to the first mold surface;
      compress the second lofted sheet to form a second molded sheet characterized by a second oriented polymeric structure corresponding to the second mold surface;
      bond the core insert to the first and second molded sheets; and
      form a peripheral portion of the multilayer panel.

2. The method of claim 1, further comprising:
   trimming offal from the peripheral portion to form a perimeter edge of the multilayer panel and such that the offal is tethered to the tethering frame; and
   removing the tethering frame from the mold with the offal attached thereto.

3. The method of claim 1, wherein activating the first and second unlofted sheets to provide the first and second lofted sheets includes heating the first and second lofted sheets to a molding temperature.

4. The method of claim 1, wherein each of the first unlofted sheet and the second unlofted sheet includes an adhesive; and
   activating the first and second unlofted sheets includes activating the adhesive.

5. The method of claim 1, wherein the first unlofted sheet further comprises an interior cover layer on its first side and an adhesive film on its second side.

6. The method of claim 1, wherein the second unlofted sheet further comprises a first adhesive film on its first side, and a second adhesive film on its second side.

7. The method of claim 6, wherein at least one of the first and second adhesive films is a perforated adhesive film.

8. The method of claim 1, wherein the tethering frame includes an orientation feature;
   the method further comprising:
   orienting the tethering frame to the mold using the orientation feature.

9. The method of claim 1, further comprising:
inserting an exterior cover layer into the mold such that the exterior cover layer is between the second lofted sheet and the second mold surface.

10. The method of claim 1, wherein the tethering frame includes:
a frame portion;
a plurality of tethering elements configured to retain an unlofted sheet to the frame portion such that the unlofted sheet is coextensive with the frame portion and operatively attached to the frame portion.

11. The method of claim 1, wherein each of the first and second molded layers is characterized by a molded thickness less than the unlofted thickness.

12. The method of claim 1, further comprising:
tethering the first unlofted sheet to another tethering frame;
wherein said activating the first unlofted sheet is performed while the first unlofted sheet is tethered to the another tethering frame; and
wherein said inserting the first lofted sheet in the mold includes inserting the another tethering frame including the first lofted sheet in the mold.

* * * * *

UNITED STATES PATENT AND TRADEMARK OFFICE
CERTIFICATE OF CORRECTION

| | | |
|---|---|---|
| PATENT NO. | : 9,233,490 B2 | Page 1 of 1 |
| APPLICATION NO. | : 14/449238 | |
| DATED | : January 12, 2016 | |
| INVENTOR(S) | : Joseph W. Marchesano and Calvin A. Saur | |

It is certified that error appears in the above-identified patent and that said Letters Patent is hereby corrected as shown below:

Claims

Column 24, line 6, claim 1:

The word "flame" should be "frame" so that the line 6 should read: "activating the second unlofted sheet on the tethering frame".

Column 24, line 15, claim 1:

The word "flame" should be "frame" so that the line 15 should read: "inserting the tethering frame including the second lofted".

Signed and Sealed this
Nineteenth Day of April, 2016

Michelle K. Lee
*Director of the United States Patent and Trademark Office*